UNITED STATES PATENT OFFICE.

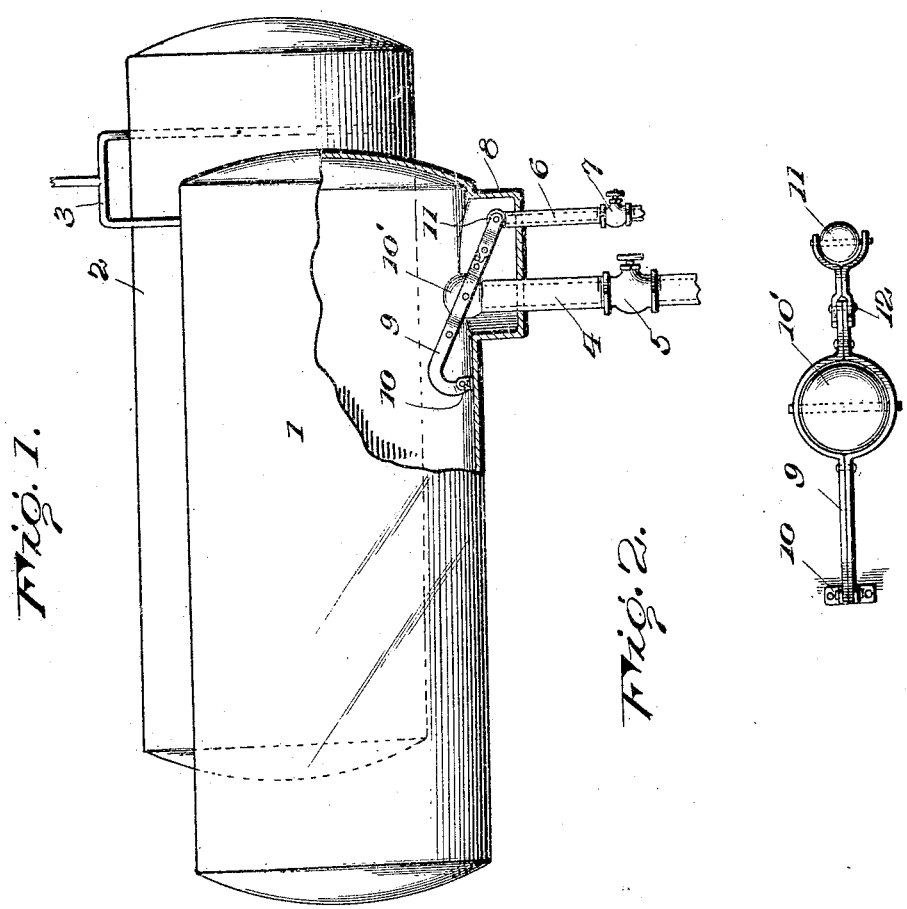

ADOLF ROSZKOWSKI, OF NEW YORK, N. Y.

AUTOMATIC VALVE.

1,364,144.	Specification of Letters Patent.	Patented Jan. 4, 1921.

Application filed February 9, 1920. Serial No. 357,484.

*To all whom it may concern:*

Be it known that I, ADOLF ROSZKOWSKI, a subject of Russia, residing at 206 Broadway, New York, in the county of New York and State of New York, have invented certain new and useful Improvements in Automatic Valves, of which the following is a specification.

This invention relates to an improved automatic valve for preventing the escape of compressed air in water supply systems for railroad stations operating under air pressure.

Patent No. 1,240,373 issued to me September 18, 1917, described such a system, and the improved valve is designed to so control the necessary water outlets from the reservoirs of the system as to prevent the escape of the compressed air as the water level in such reservoir falls to the minimum.

In the drawings:

Figure 1 is a view in elevation partly broken out illustrating the application of the improved valve.

Fig. 2 is a perspective view of the improved valve.

The system referred to may be briefly described as comprising a series of reservoirs, arranged in pairs, reservoir 1 being adapted to contain water and reservoir 2 adapted to contain air under pressure. Both reservoirs are served from a remote pump station, and a series of such reservoirs will constitute the system.

The reservoirs are connected by pipe 3, whereby the flow of water from reservoir 1 is through the pressure of air from tank 2.

A service water pipe 4 leads from reservoir 1 and has a gate valve 5 therein beyond the reservoir. A sediment pipe 6 leads from reservoir 1 and has a cut off valve 7 therein beyond the reservoir. The reservoir 1 has a sediment trap 8 therein, and pipes 4 and 6 open through this trap, pipe 4 extending above pipe 6, and having its open end formed for valve coöperation.

The improved valve comprises a lever 9, pivotally mounted at 10 within the reservoir adjacent the sediment trap. This lever carries valves 10 and 11, the former coöperating with and closing the end of pipe 4, while the latter coöperates with and closes the pipe 6. The lever is so mounted, the valve so positioned and the ends of pipes 4 and 6 so arranged that in the limit position in one direction the valves 10 and 11 will simultaneously coöperate with and close the respective pipes.

While the reservoir contains water to an appreciable height the valves are floated to open position and so maintained until the level of the water in the reservoir is such that the valves function, and further escape of water or the escape of any of the compressed air is prevented.

In the normal operation of the system the valve 5 is open and valve 7 is closed, while when the reservoir is to be emptied for inspection or repair valve 5 is closed and valve 7 opened. In order to blow off the sediment the valve 7 is open, and if at this moment no water is pumped into the reservoir 1 through the valve 5, the water level will decrease until the improved valve closes the entrance into the pipes 4 and 6 and keeps the compressed air within the reservoir. When the pump starts again to work, it forces water into the tank 1 by uplifting the valve 10 against the air pressure.

The lever 9 is preferably in pivotally connected sections between the valves, so as to secure tight closing of the valve 11 under the air pressure after the valve 10 has closed. Sufficient water is left in the extension 8 so as to keep the valves 10 and 11 partly submerged when in closed position.

Of course each water reservoir of the system, or where but one reservoir is used for both water and compressed air, then all reservoirs of the system will be provided with the improved valve.

Claims:

1. A reservoir for delivering water under compressed air, a water outlet from said reservoir, a sediment outlet from the reservoir, and valve means positioned by the water in the reservoir for simultaneously closing both outlets at a predetermined water level in such reservoir.

2. A reservoir for delivering water under compressed air, a water outlet from said reservoir, a sediment outlet from the reservoir, a lever pivoted in such tank, a valve on such lever for one outlet, and another valve on the lever for the other outlet, the movement of the lever operating both valves to closing positions simultaneously.

3. A reservoir for containing water under air pressure, a sediment trap in such reservoir, a water pipe opening through such trap to the reservoir, a sediment pipe opening into the trap, a lever pivotally mounted within the tank, a valve carried by said lever for closing the water pipe, and a valve carried by such lever for closing the sediment pipe, the pivotal mounting of the lever and the relative positions of the ends of such water and sediment pipes causing the simultaneous closing function of both valves.

4. A reservoir for containing water under air pressure, a sediment trap in such reservoir, a water pipe opening through such trap to the reservoir, a sediment pipe opening into the trap, a pivoted-section lever pivotally mounted within the tank, a valve carried by said lever for closing the water pipe, and a valve carried by such lever for closing the sediment pipe, the pivotal mounting of the lever and the relative positions of the ends of such water and sediment pipes causing the simultaneous closing function of both valves.

In testimony whereof I affix my signature.

ADOLF ROSZKOWSKI.